United States Patent
Schryer et al.

(10) Patent No.: US 8,751,386 B2
(45) Date of Patent: Jun. 10, 2014

(54) IMPULSE DONATION/BUY WITHOUT RISK METHOD

(75) Inventors: Norman Loren Schryer, New Providence, NJ (US); Andrew Hume, Howell, NJ (US); Thomas Killian, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 621 days.

(21) Appl. No.: 12/154,920

(22) Filed: May 28, 2008

(65) Prior Publication Data
US 2009/0299899 A1   Dec. 3, 2009

(51) Int. Cl.
*G06Q 40/00*   (2012.01)

(52) U.S. Cl.
USPC ............. 705/40; 705/39; 705/38; 705/35

(58) Field of Classification Search
USPC .................................................. 705/40
See application file for complete search history.

(56) References Cited

U.S. PATENT DOCUMENTS

| | | | |
|---|---|---|---|
| 7,437,457 B1* | 10/2008 | Eisendrath et al. | 709/225 |
| 8,160,922 B2* | 4/2012 | Postrel | 705/14.19 |
| 8,280,811 B2* | 10/2012 | Wolfston, Jr. | 705/39 |
| 2003/0233278 A1* | 12/2003 | Marshall | 705/14 |
| 2004/0258228 A1* | 12/2004 | Alcott et al. | 379/114.01 |
| 2005/0021353 A1* | 1/2005 | Aviles et al. | 705/1 |
| 2005/0108132 A1* | 5/2005 | Doynow | 705/35 |
| 2005/0283434 A1* | 12/2005 | Hahn-Carlson et al. | 705/39 |
| 2007/0003038 A1* | 1/2007 | Siegel et al. | 379/201.01 |
| 2007/0174124 A1* | 7/2007 | Zagofsky et al. | 705/14 |
| 2007/0288312 A1* | 12/2007 | Wang | 705/14 |
| 2009/0012865 A1* | 1/2009 | Celik | 705/14 |
| 2009/0299820 A1* | 12/2009 | Wang et al. | 705/10 |

* cited by examiner

*Primary Examiner* — Hai Tran
(74) *Attorney, Agent, or Firm* — Hartman & Citrin LLC

(57) ABSTRACT

A method and system are disclosed for enabling a subscriber to a service provider to purchase goods or make donations to a third-party unaffiliated with the service provider. The system generates an electronic bill for a service provided to the user, where the electronic bill includes at least one selection for a purchase from or a donation to the third-party. The selection for purchase or donation from the user is received accompanied by an immediate or subsequent receipt of an indication of payment from the user. The payment indication includes payment for the service and the purchase or donation. The user has up until payment is actually made to revoke the purchase or donation selection. The transaction is completed by the service provider with the third-party to effectuate the purchase or donation.

9 Claims, 4 Drawing Sheets

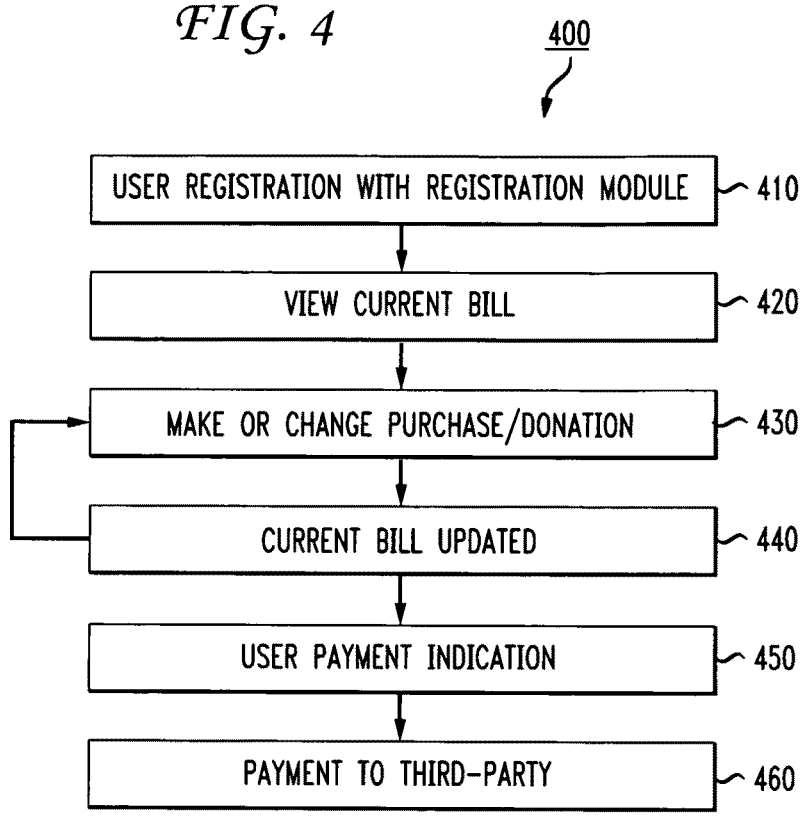

IMPULSE DONATION/BUY WITHOUT RISK METHOD

FIELD OF THE INVENTION

The present invention relates generally to electronic commerce, and more particularly, to a system and method for enabling existing customers of a business who receive periodic electronic billing for a service to transact an impulse purchase or donation with a third-party, where the payment for the purchase or donation is added to their current account balance for the service.

BACKGROUND OF THE INVENTION

Electronic Commerce or e-commerce, the exchange of goods and services by means of the Internet or other computer networks, has dramatically changed the way businesses and individuals conduct business. E-commerce follows the same basic principles as traditional commerce, that is, buyers and sellers come together to exchange goods and/or services for money. But rather than conducting business in the traditional way—in stores and other "brick and mortar" buildings or through mail order catalogs and telephone operators, in e-commerce buyers and sellers conduct such transactions over the Internet, using Network Access Devices (NADs), including but not limited to, personal computers or laptops, personal digital assistants (i.e., a BlackBerry® or like device), land-line telephones and/or cellular telephones.

E-commerce provides buyers with unmatched convenience and ease of conducting commercial transactions. Purchasers can visit the World Wide Web (WWW) sites of vendors twenty-four hours a day/seven days a week, compare prices and make purchases, all without the need to leave their homes or offices, or even while on the go. In some cases, consumers can immediately obtain a product or service, such as an electronic book, a music file, or computer software, by downloading the same over the Internet. In other cases, consumers can check inventory at a local brick-and-mortar retailer and pick up the product immediately. In yet other cases, consumers can have orders shipped to the location of their choosing. In order to complete typical purchase transactions, billing information (and any necessary shipping information) needs to be collected, verified and executed in an efficient and secure manner.

For sellers, e-commerce provides a way to cut costs and expand markets. Since business activity is centered around network access devices, networks and servers, there is a reduced need for building, staffing, maintaining a physical location and/or distributing mail order catalogs. Automated order tracking and billing systems that are coupled to a communications network reduce labor costs, and if the product and/or service can be downloaded, e-commerce firms incur minimal distribution costs. By selling over the Internet, sellers have the potential to market their products or services globally, and thus are not limited by the physical location of a store. Internet technologies also permit sellers to track the interests and preferences of their customers, with the customer's permission, and to thereafter utilize this information to build an ongoing relationship with the customer by making recommendations or customizing products and services to meet the customer's needs. Making recommendations to buyers (or potential buyers) is a significant aspect of the Amazon.com Web experience. With this functionality, personalized recommendations are made. For example, when searching for a digital camera, recommendations for accessories (loosely based on purchase and browsing history) such as memory cards, cases, or editing software are made to complement the purchase being considered.

E-commerce, however, also has some practical limits and disadvantages. Consumers are reluctant to buy some products online. Online furniture businesses, for example, have failed for the most part because customers frequently want to touch and feel the quality and comfort of an expensive item, such as for example a sofa, before making such a large purchase. Additionally, shipping costs for large, heavy items can add significant costs to the purchase. Many people also consider shopping a social experience. For instance, they may enjoy going to a store or a shopping mall with friends or family, an experience that cannot be duplicated online.

Security and privacy for financial transactions made over the Internet (i.e., by credit card, checking account, open account or other financial instrument) is a major concern for all potential customers who engage in e-commerce. Established encryption methods such as Secure Sockets Layer (SSL), a protocol developed by Netscape Communications Corporation, encode credit card numbers and other information to foil would-be thieves. Buyers can determine if the site they are using is secure by noting the "secure" icon at the bottom of their browser window. In addition, the address bar of Internet browsers will carry the "https" prefix instead of the standard "http" prefix when the site is secured. Nevertheless, some consumers are reluctant to divulge credit card information over the Web, and this reluctance has hindered the growth of e-commerce. In addition to credit card security, many shoppers worry about privacy. To placate Web purchasers, many Internet stores post "privacy statements" that explain their policy of sharing or not sharing customer information with others. A privacy policy may include refusing to give the customer's name and e-mail address to companies that send unsolicited and unwanted commercial e-mail messages, often known as junk mail or spam. In 2003 the U.S. Congress passed legislation designed to curb the explosive growth of spam. The new law made it illegal for senders of unsolicited commercial e-mail to disguise their identity by using false return addresses or misleading subject lines. Violators were subject to steep fines and possible prison terms. The law also prohibited the gathering of e-mail addresses from Web sites. Sponsors of the legislation estimated that the incredible growth in spam, representing about half of all e-mails, cost Internet access providers $9 billion annually in technology-related expenses necessary to handle the increased volume of e-mail. Clogged in-boxes also annoyed consumers and made it difficult to distinguish between solicited and unsolicited commercial e-mail messages.

Mobile commerce (also known as M-Commerce, mCommerce or U-Commerce, owing to the ubiquitous nature of its services) is defined as any transaction, involving the transfer of ownership or rights to use goods and services, which is initiated and/or completed by using mobile access to computer-mediated networks with the help of an electronic device. This definition provides for a differentiation of M-Commerce from other related fields such as Electronic Commerce, Electronic Business and Mobile Business.

Mobile Commerce is the ability to conduct commerce, using a mobile network access device (NAD). Examples of M-Commerce NADs are a mobile phone (or cell phone), a PDA, a Smartphone (combining functionality of a mobile phone and a PDA) and other emerging mobile equipment, like dashtop (automotive) mobile devices.

Mobile payment is defined as processing a payment for goods or services with a mobile device such as a mobile phone, Personal Digital Assistant (PDA), or other such NAD. Such systems are also used in developing countries for micropayments. Vendors in Europe including Verrus Mobile Technologies and Easy Park use contactless payment over mobile phones to pay for on- and off-street parking in specially demarcated areas. First conceptualized in the 1990s, the technology has seen commercial use in both Scandinavia and Estonia. Users benefit from the convenience of being able to pay for parking from the comfort of their car with their mobile phone, and parking operators are not obliged to invest in either existing or new street-based parking infrastructure. Payment is usually linked to either the account directly (add to service bill) or linked to a credit card.

In the above examples of e-commerce, m-commerce and mobile payments, a payment is transacted as the service is delivered or about to be delivered. If the transaction is reconsidered and the user would like to cancel or modify the conditions of the transaction, typically the dispute resolution needs to be handled primarily by the user. This can be a time consuming and daunting task for the user to act as the intermediary between the business and the payer (i.e. bank, credit or debit card company, telecom provider, pre-paid provider, or other financial instrument) or with the payer directly.

On-line web surfers often wish to make spur-of-the-moment purchase or donation decisions. Current options like PayPal™ and Amazon's Honor System™ are expensive, as they typically have a per transaction charge plus an additional fee of up to about 3% of the value of the transaction. Additionally, when reconsidering such a transaction, dispute resolution varies greatly with each organization and can be time consuming, frequently not worth the effort given the monetary amount of the transaction.

It would therefore be desirable to enable existing customers of a business who receive periodic electronic billing to transact an impulse buy or donation decision (to a third-party) which is immediately included to their current account balance. Only after the current bill is paid for by the user is the transaction paid by the billing business to the third-party, minimizing risk. The user can reconsider and even cancel the transaction up to the time when the bill is paid, also minimizing risk. To the inventors' knowledge, no such system or method is currently available.

SUMMARY OF THE INVENTION

In accordance with aspects of the invention, a method and system are disclosed for enabling a subscriber to a service provider to purchase goods or make donations to a third-party unaffiliated with the service provider. The system generates an electronic bill for a service provided to the user, where the electronic bill includes at least one selection for a purchase from or a donation to the third-party. The selection for purchase or donation from the user is accompanied by an immediate or subsequent receipt of an indication of payment from the user. The payment indication includes payment for the service and the purchase or donation. The user has up until payment is actually made to revoke the purchase or donation selection. The transaction is completed by the service provider with the third-party to effectuate the purchase or donation.

A methodology in accordance with an aspect of the invention enables a subscriber to a service provider (i.e., a telecommunications service provider), to purchase goods or make a donation to a third-party, comprising the steps of: generating an electronic bill for the service provided to the user, the electronic bill including at least one selection for a purchase from or a donation to the third-party; receiving the selection for purchase or donation from the user; receiving an indication of payment from the user, the payment indication including payment for the service and the purchase or donation; completing a transaction with the third-party for the purchase or donation; and applying payments received from the user in connection with the service invoiced on the bill towards the user transaction with the third-party.

A system in accordance with an aspect of the invention for enabling a subscriber to a service provider to purchase goods or make a donation to a third-party, comprises: a billing module for generating an electronic bill for a service provided to the user, the electronic bill including at least one selection for a purchase from or a donation to the third-party; a registration module for receiving the selection for purchase or donation from the user; a payment module for receiving an indication of payment from the user, the payment indication including payment for the service and the purchase or donation; and a transaction module for completing a transaction with the third-party for the purchase or donation.

A methodology in accordance with an aspect of the invention enables a subscriber to a service provider to purchase goods or make a donation to a third-party, comprising the steps of: receiving at least one selection for purchase or donation from the third-party; generating an electronic bill for the service provided to the user, the electronic bill including charges for the at least one selection for purchase or donation; receiving an indication of payment from the user, the payment indication including payment for the service and the purchase or donation; completing a transaction with the third-party for the purchase or donation; and applying payments received from the user in connection with the service invoiced on the bill towards the user transaction with the third-party.

These aspects of the invention and further advantages thereof will become apparent to those skilled in the art as the present invention is described with particular reference to the accompanying drawings.

BRIEF DESCRIPTION OF THE DRAWINGS

FIG. 4 is a flow chart of an illustrative method in accordance with an aspect of the invention.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present invention allows Web surfers to use any Network Access Device (NAD), fixed or mobile, and provides the framework for rapid, secure and low risk on-line transactions without having to repeatedly provide sensitive financial and personal information. The present invention makes it possible for customers of a service provider (i.e. telecom service provider) who receive periodic electronic billing to transact spur-of-the-moment purchase or donation decisions which immediately show up on their outstanding bill for services rendered. The transaction is paid by the billing business to the third-party only after it is paid by the user, minimizing risk. The user can reconsider and even cancel the transaction up to the time when the bill is paid, also minimizing risk.

Figure 1:
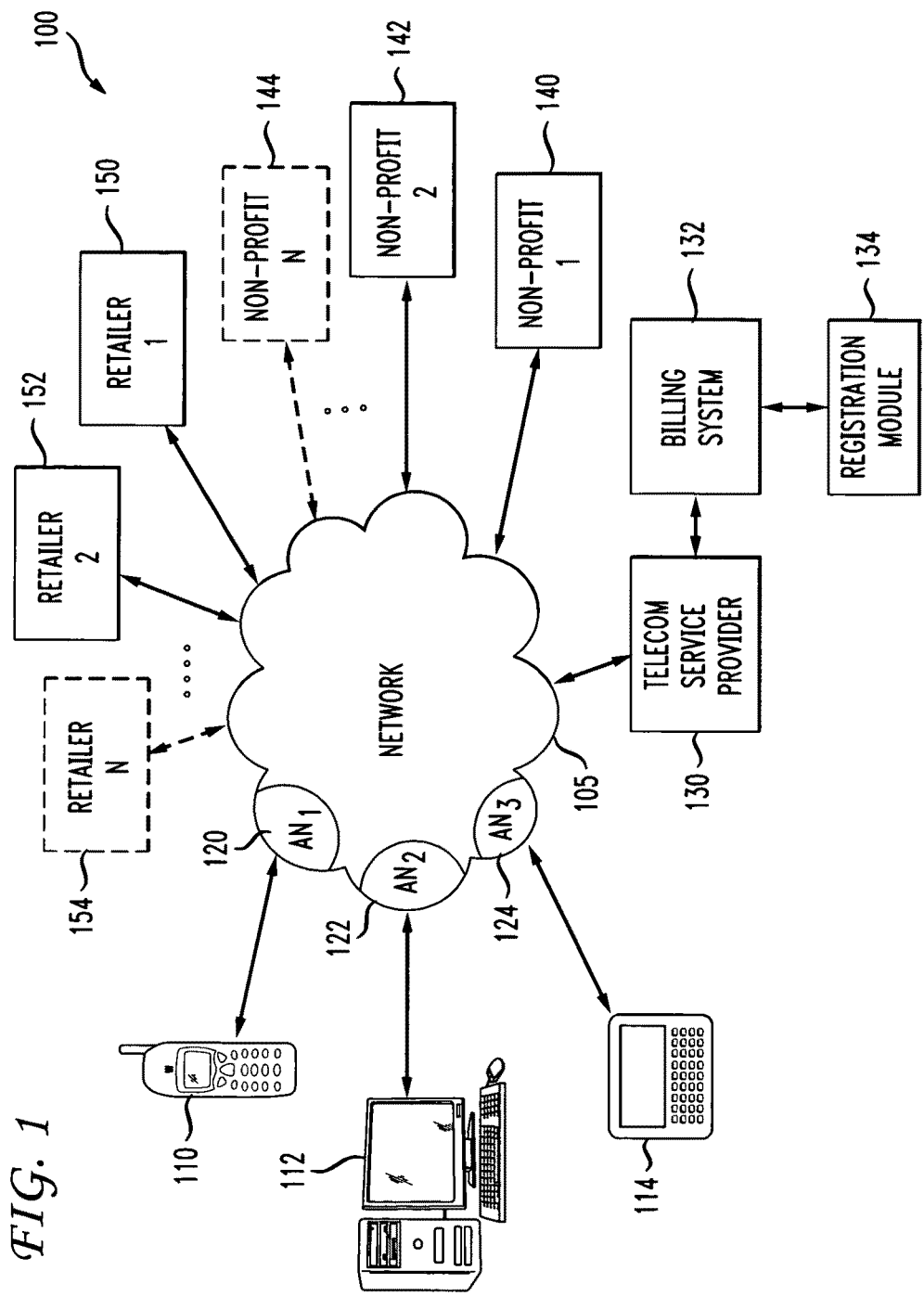
FIG. 1 is a schematic of an exemplary communications network, in accordance with an aspect of the invention.

Referring now to FIG. 1, there is depicted an exemplary network 100, whereby a Telecom service provider (i.e., AT&T, the assignee of the present invention) enables spur-of-the-moment purchase or donation decisions with third-party retailers 150-154 and/or non-profit organizations 140-144. A plurality of users is connected to the network 100 in a conventional manner. As shown, user 110 utilizes a cell phone NAD to communicate with Access Network 1 ($AN_1$) 120 to reach a long-haul backbone network 105. User 112 utilizes a personal computer NAD to communicate with Access Network 2 ($AN_2$) 122 to reach network 105. User 114 utilizes a personal digital assistant NAD to communicate with Access Network 3 ($AN_3$) 124 to reach network 105. A telecom service provider 130 is coupled to network 105 and may even manage network 105 and one or more ANs 120-124. The telecom service provider 130 also includes a billing system 132 and a registration module 134. The registration module 134 contains a database of registered users and a customized list of third-party purchase/donate organizations (i.e. retailers and/or non-profits, or the like) that each user desires to link for purchase(s)/donation(s) to their service provider bill, including the organization contact information (name, address, financial account information, etc.).

Figure 2:
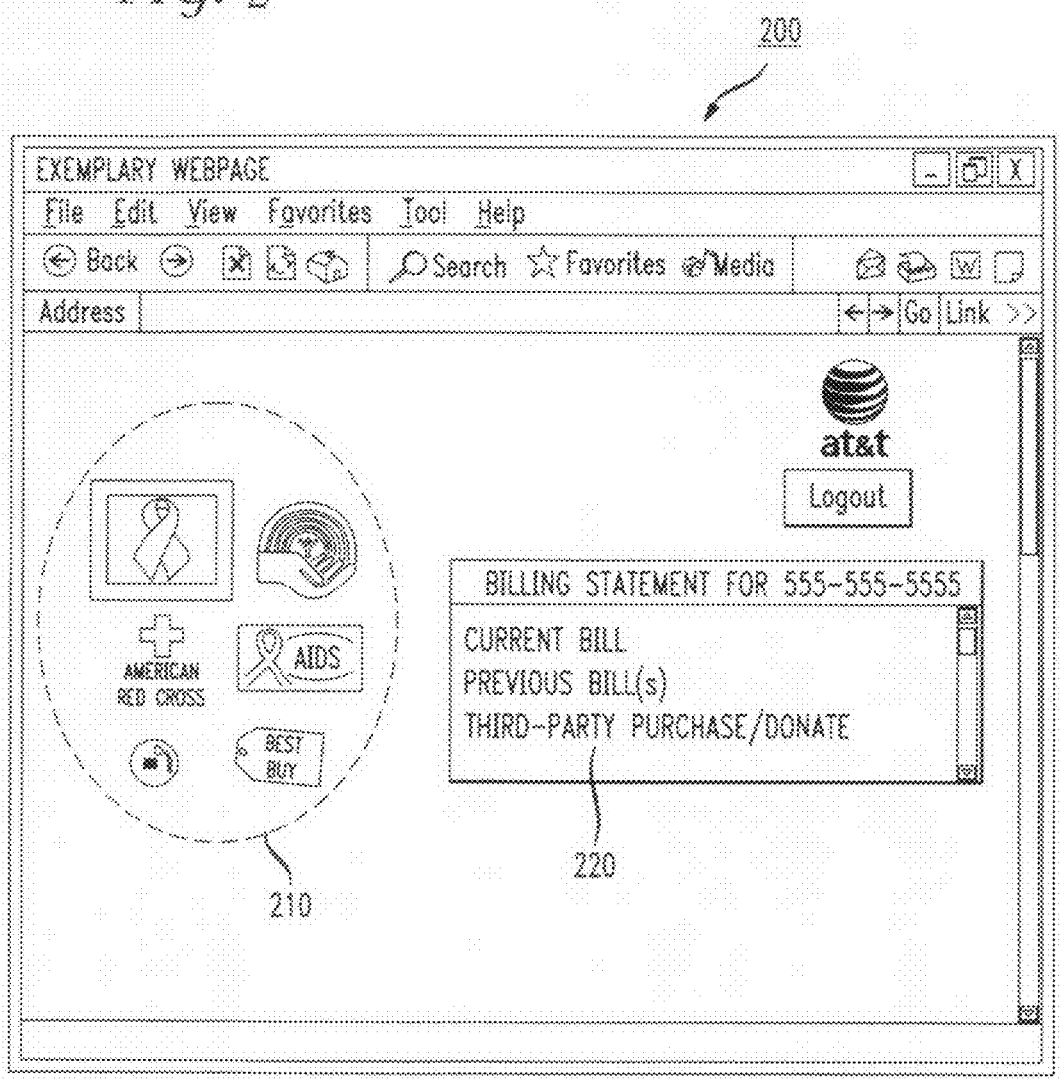
FIG. 2 is an exemplary webpage in accordance with an aspect of the invention.

In accordance with an aspect of the invention, a user will register his or her intention to make a purchase or donation through the service provider's billing web page. An exemplary webpage 200 shown in FIG. 2, depicts a new monthly on-line billing statement, including the organizations that have been registered via the registration module 134 of FIG. 1. This webpage 200 may be accessed by any NAD having a web browser, such as those examples shown in FIG. 1 (NADs 110, 112 and 114). From this webpage, a user can initiate purchases and/or donations with registered organizations which are presented on the page as a result of the registration process. These may be displayed as selectable icons (collectively shown as 210) or may be contained in a pulldown window item 220. After the user makes a selected purchase/donation via the service provider's billing site, the transaction is delayed until the service provider receives a user payment indication in connection with the outstanding bill for services. Thus, the actual purchase/donation transaction is not completed with the third-party until receipt of the payment indication from the user by the service provider or its authorized billing service. The trigger point for "payment" is defined herein as a "payment indication" in lieu of a straight "payment" or actual money transfer. The scheduled payment due date for payment of the service provider's bill affords the user the opportunity to change their mind up until the moment he or she actually pays the bill. The established billing system of the telecom service provider (FIG. 1, entity 132) advantageously permits low transaction fees since they are typically adapted to issue large numbers of invoices at the same time. In addition, the service provider can make a delayed disbursement of payment to the third-party (i.e., after the service provider's bill is paid by the user), which potentially enables floating the payment(s) for the auxiliary purchase/donation to the third party, by the service provider itself, thereby reducing "risk" to both the user and third party in regard to the purchase/donation transaction. In this regard, the user is permitted to cancel, modify or otherwise alter the purchase/donation until such time that a payment indication has been made to the service provider (i.e., payment indication made by the billing due date). After receipt of the payment indication, the transaction is then completed with the third party. The service provider may employ their own billing system, or contract this function to any third party or financial clearinghouse to facilitate payments for the purchase/donation(s) to the appropriate third-party organization(s).

Figure 3:
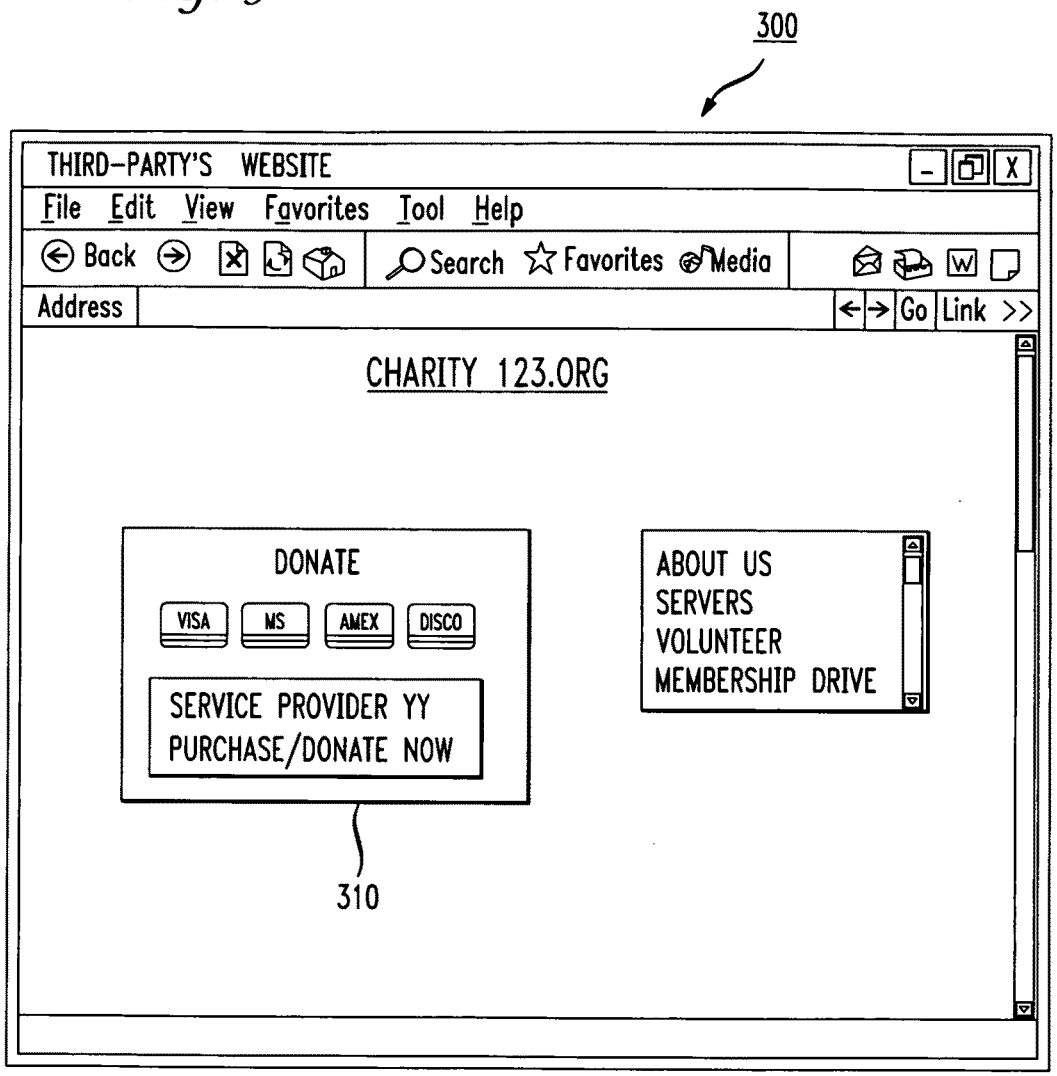
FIG. 3 is an exemplary webpage in accordance with an aspect of the invention.

FIG. 3 shows an alternative embodiment, which enables a purchase/donation transaction to be initiated from a third-party's website 300 (i.e., Charity123.org.) in lieu of the service provider's billing site. In this example, a user browsing Charity123.org's website 300 can click on the "Service Provider YY purchase/donate now" icon 310, and make a donation to that organization. The user has a service agreement with service provider YY (i.e. telecom services), which will facilitate this transaction in accordance with the methodology described above. In this example, the user selects icon 310 which initiates a log-on procedure to the user's account with the service provider YY. The user thereafter enters the amount of the donation. This transaction cost for this donation is then added to the user's next bill for services subscribed to from service provider YY. In a manner similar to the embodiment described above, the actual payments to the third party for the purchase/donation transaction are made after a user payment indication has been made to the service provider. Thus, the user has the opportunity to change their mind regarding the purchase/donation until a payment indication is made to the service provider.

FIG. 4 is a flow chart 400 of an illustrative method in accordance with an aspect of the invention. In step 410, the user logs onto the website of a service provider with which they have a service agreement, and visits a registration module (entity 134 of FIG. 1) to enter contact information (name, address, financial account information, and the like) for each non-profit and retailer they may wish to make donations to or purchases from. In step 420, a current bill is presented to the user for viewing thereof, including icons (entity 210 of FIG. 2) and a pulldown menu (entity 220 of FIG. 2), of organizations that have been registered via the registration module 134 of FIG. 1. A benefit of making the icons 210 and a pulldown menu 220 clearly visible with the current bill is to facilitate an increased likelihood of repeated use. These items can also be removed by the user by visiting the registration module (see FIG. 1, entity 134) and un-registering the desired items. In step 430, the user can make and/or change a purchase/donation decision. In step 440, the current bill is updated (i.e., refreshed) right away reflecting purchase/donation decision additions or changes. At any time until the billing invoice due date, additional purchase/donation decisions can be made, in addition to changing or canceling purchase/donation decisions that are currently listed on the bill. This is illustrated by the arrow looping from step 440 to step 430. A user can initiate payment for both the service and purchase(s)/donation(s) using well known methods. Payments are typically made via check, credit card, auto-bill schemes utilizing a bank account, credit card, debit card or the like, or via one-time debits from any type of financial account. Thus, the trigger point for "payment" is a "payment indication" (step 450) in lieu of a straight "payment" or actual money transfer. In this regard, the providing of a credit card authorization constitutes a user payment indication as contemplated by the appended claims. In all events, the purchase/donate transaction that is initiated with the service provider's bill is not completed with the third party until a payment indication has been received from the user in connection with the bill for the service. After the user's payment indication has been received, a payment is made to the third-party (step 460) by the service provider. This can occur in several ways. For example, the service provider can directly pay the monies collected from the invoice to the third-party, or the service provider can direct an unaffiliated billing party (i.e., bank, credit card company, Pay Pal®, or some other clearinghouse) to make the payment to the third-party.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method comprising:
   receiving, from a user of a telecommunications service via a network access device, a plurality of registrations, each registration of the plurality of registrations relating to a third-party of a plurality of third-parties, each of the plurality of third-parties being unaffiliated with a provider of the telecommunications service;
   providing, to the user via the network access device, an electronic bill, the electronic bill comprising charges for telecommunications services provided by the telecommunications service provider, and further comprising selections to initiate a transaction between the user and each of the plurality of third parties;
   in response to the user selecting a first selection of the selections to initiate a first transaction between the user and a first third party of the plurality of third parties, receiving, from the user via the network access device, an initiation of the first transaction between the user and the first third party of the plurality of third parties;
   updating the electronic bill to reflect charges for the first transaction between the user and the first third party of the plurality of third parties;
   receiving, from the user via the network access device, a payment for the electronic bill, at least a first portion of the payment for the electronic bill comprising a payment for the charges for the first transaction between the user and the first third party of the plurality of third parties; and
   paying the first third party of the plurality of third parties the charges for the first transaction between the user and the first third party of the plurality of third parties.

2. The method of claim 1, wherein the transaction is at least one of a purchase or a charitable donation.

3. The method of claim 1, further comprising:
   receiving, prior to receiving the payment for the electronic bill, a cancellation of the first transaction between the user and the first third party of the plurality of third parties; and
   updating the electronic bill such that the electronic bill does not reflect the charges for the first transaction between the user and the first third party of the plurality of third parties.

4. The method recited in claim 1, further comprising:
   in response to the user selecting a second selection of the selections to initiate a second transaction between the user and a second third party of the plurality of third parties, receiving an initiation of the second transaction between the user and the second third party of the plurality of third parties; and
   updating the electronic bill to reflect additional charges for the second transaction between the user and the second third party of the plurality of third parties, wherein at least a second portion of the payment for the electronic bill comprises a payment for the additional charges for the second transaction between the user and the second third party of the plurality of third parties, and wherein the first third party of the plurality of third parties is paid for the charges for the first transaction between the user and the first third party of the plurality of third parties and the second third party of the plurality of third parties is paid for the additional charges for the second transaction between the user and the second third of the plurality of third parties.

5. The method of claim 1, wherein the electronic bill is presented in a browser readable format.

6. The method of claim 1, wherein the electronic bill is downloaded to the network access device from a billing system of the telecommunications service provider.

7. The method of claim 1, wherein paying the first third party of the plurality of third parties comprises sending a payment command to an independent billing system to issue the payment for the charges for the first transaction between the user and the first third party of the plurality of third parties to the first third party of the plurality of third parties.

8. The method of claim 1, wherein the selections to initiate a transaction between the user and each of the plurality of third parties comprise, for each of the plurality of third parties, a respective graphic symbol representing each of the plurality of third parties.

9. The method of claim 1, wherein the selections to initiate a transaction between the user and each of the plurality of third parties comprise a pull-down menu comprising, for each of the plurality of third parties, a respective pull-down menu entry representing each of the plurality of third parties.

* * * * *